(12) United States Patent
Carmi et al.

(10) Patent No.: US 9,817,892 B2
(45) Date of Patent: Nov. 14, 2017

(54) AUTOMATED REMOVAL OF PRIVATE INFORMATION

(71) Applicant: Verint Systems Ltd., Herzilya Pituach (IL)

(72) Inventors: Saar Carmi, Kiryat Ono (IL); Yair Horesh, Kfar-Saba (IL); Galia Zacay, Ganei-Tikva (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 357 days.

(21) Appl. No.: 14/609,783

(22) Filed: Jan. 30, 2015

(65) Prior Publication Data

US 2015/0220626 A1 Aug. 6, 2015

Related U.S. Application Data

(60) Provisional application No. 61/934,315, filed on Jan. 31, 2014.

(51) Int. Cl.
*G06F 17/30* (2006.01)
(52) U.S. Cl.
CPC .............................. *G06F 17/30699* (2013.01)
(58) Field of Classification Search
CPC .................................................. G06F 17/30699

USPC .......................................... 707/737; 713/165
See application file for complete search history.

(56) References Cited

U.S. PATENT DOCUMENTS

| | | | | |
|---|---|---|---|---|
| 2006/0075228 A1* | 4/2006 | Black | .................. | H04L 63/0428 713/167 |
| 2008/0016341 A1* | 1/2008 | Staddon | .............. | G06F 21/6209 713/165 |
| 2010/0011000 A1* | 1/2010 | Chakra | .................. | G06F 19/322 707/E17.005 |

* cited by examiner

*Primary Examiner* — Chelcie Daye
(74) *Attorney, Agent, or Firm* — Meunier Carlin & Curfman

(57) ABSTRACT

Systems, methods, and media for the automated removal of private information are provided herein. In an example implementation, a method for automatic removal of private information may include: receiving a transcript of communication data; applying a private information rule to the transcript in order to identify private information in the transcript; tagging the identified private information with a tag comprising an identification of the private information; applying a complicate rule to the tagged transcript in order to evaluate a compliance of the transcript with privacy standards; removing the identified private information from the transcript to produce a redacted transaction; and storing the redacted transcript.

14 Claims, 3 Drawing Sheets

AUTOMATED REMOVAL OF PRIVATE INFORMATION

RELATED APPLICATIONS

This application claims the benefit of priority to U.S. Patent Application No. 61/934,315, filed on Jan. 31, 2014, entitled "Automated Removal of Private Information," the disclosure of which is incorporated herein by reference in its entirety.

BACKGROUND

Strings of numbers or other information, such as prices, dates, telephone numbers, credit card numbers, account numbers, addresses, or the like can present challenges to the application of speech analytics to transcription data. The wide variety of ways in which a speaker presents this information further adds complexity and confusion in the interpretation of these information strings. Therefore, improved methods and systems for processing information strings in transcription data is desired.

Private information is often provided in an interpersonal communication in such information strings. In some settings wherein interpersonal communications are recorded, transcribed, and/or otherwise stored, a company or organization may have a desire or need to avoid recording, transcribing, and/or storing in order to comply with internal policy, law, or regulation.

SUMMARY OF THE DISCLOSURE

The following is a simplified summary of the disclosure to provide a basic understanding of some of the aspects of the examples presented herein. This summary is not intended to identify key or critical elements of the disclosure or to define the scope of the inventions.

Methods of the present disclosure allow for the automated removal of private information in communication data. In an example implementation, a method for automatic removal of private information may include: receiving a transcript of communication data; applying a private information rule to the transcript in order to identify private information in the transcript; tagging the identified private information with a tag comprising an identification of the private information; applying a complicate rule to the tagged transcript in order to evaluate a compliance of the transcript with privacy standards; removing the identified private information from the transcript to produce a redacted transaction; and storing the redacted transcript.

In some implementations, the method may include defining at least one private information rule. A private information rule may be defined by defining lists of related terms, wherein each of the lists of related terms includes an identifier or name, and defining at least one category of private information with respect to one or more of the lists of related terms. Some example categories include affiliated words, indifferent words, inhibited words, and marker words.

In some implementations, a private information rule may include a length and a tolerance. The length being a number of words that may be included in the private information and the tolerance identifying a number of words that may be included in the private information that do not match the private information rule. Additionally, in some implementations applying the at least one private information rule may include identifying the affiliated words found in a transcript and stringing the affiliated words into word strings that include indifferent words and additional words that are within the word tolerance. Additionally, in some implementations, the method may include analyzing the identified strings such that any left, internal, or right markers are identified and such that no inhibited words exist in possible private information.

In some embodiments, the method may include replacing the private information with a name of the tag itself.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DISCLOSURE

Figure 1:
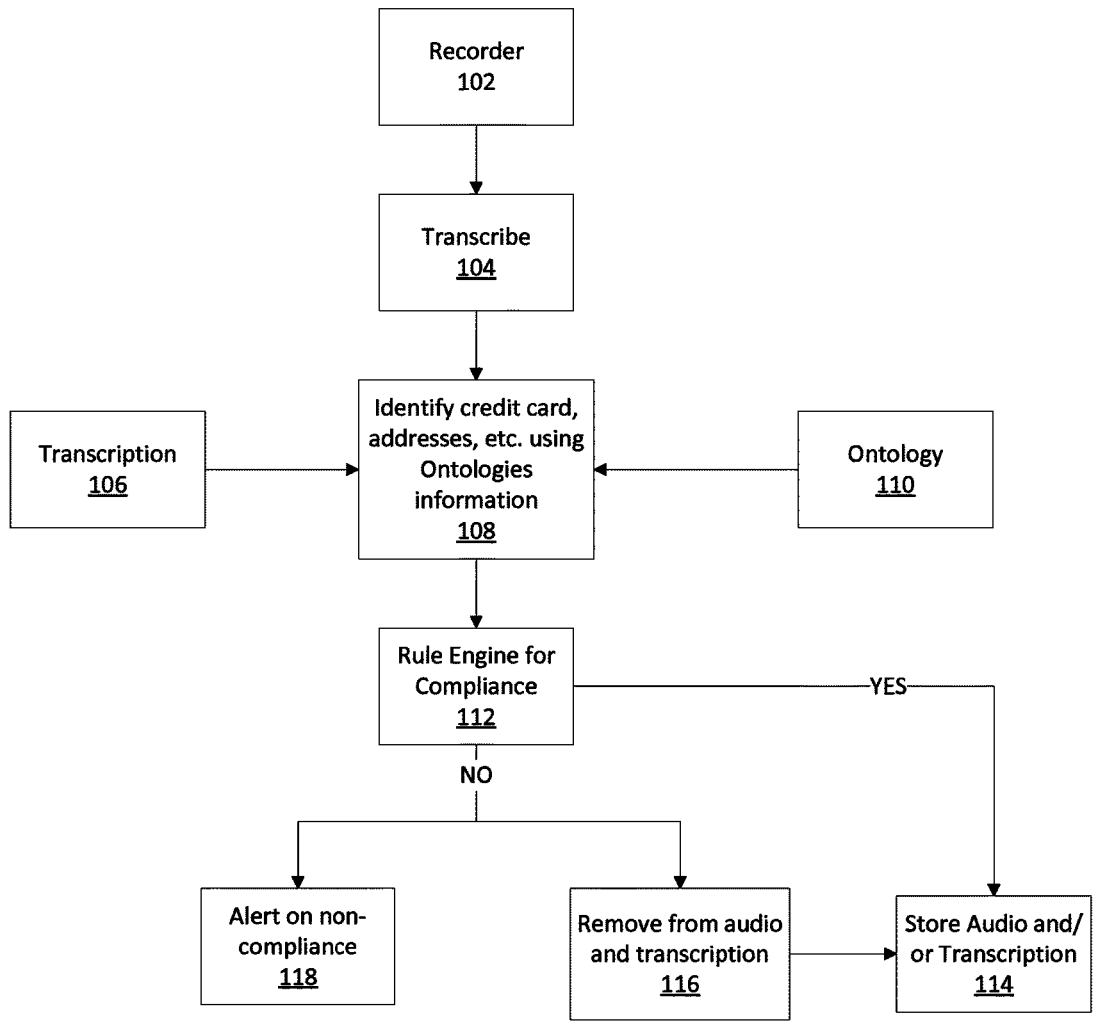
FIG. 1 is a flowchart that depicts an embodiment of a method of the automated removal of private information.

FIG. 1 is a flow chart that depicts an exemplary embodiment of a method 100 of automated removal of private information. In some settings wherein communication data, exemplarily interpersonal communication data, is generated, acquired, and/or stored, internal, legal, or regulatory requirements for the treatment and handling of private information presents challenges as the private information must be deleted or otherwise redacted from the communication data. In exemplary embodiments of a customer service interaction between a customer and a customer service agent will be used herein for exemplary purposes of the communication data; however, it will be recognized that other types of communication data of interpersonal communication can be used in additional embodiments. In the presently available systems, a customer service agent can operate a manual "mute" button at the customer service agent work station which will temporarily pause, stop, or redact recording the communication data. When the customer service agent knows that the customer will be giving private information, the customer service agent activates the "mute" button and the private information is not recorded. However, the operation of this manual button presents a source of error as the customer service agent may forget to restart the recording after the private information has been given, or the customer service agent may forget to activate this feature and the private information is recorded. Therefore, embodiments as described herein enable the automated review of either previously redacted communication information (e.g. by customer service agent operation of the aforementioned mute button) or the review and analysis of recorded and un-redacted communication data, in order to meet compliance with privacy and confidential information standards, laws, and regulations.

In the method 100 sources of transcribed communication data are identified. In one embodiment an audio recorder at 102 records the communication data of the customer service interaction between the customer service agent and the customer. This audio data is provided to a transcription engine to transcribe the audio data at 104. In embodiments, the transcription at 104 may be a transcription in real time, exemplarily using large vocabulary continuous speech recognition (LVCSR) transcription techniques or may be a transcription of previously recorded audio data using any of a variety of speech-to-text transcription techniques. At 106 previously stored transcription data is provided. These other sources of transcription data may include previously transcribed audio data and may include transcriptions of audio data that has been redacted, such as by using the "mute" button described above. In other embodiments, the transcription at 106 may be a text file of communication data that did not originate as audio data, exemplarily web chat or emails. It is also to be noted that in embodiments transcriptions provided either at 104 or at 106 may also be stored in association with underlying communication data (e.g. audio file or email) from which the transcription originated for reasons as will be described in further detail herein.

At 108 the private information in the transcriptions is identified. In an exemplary embodiment the private information may be identified as described in further detail with respect to the method 300 in FIG. 3 through the application of private information rules. Additionally, embodiments may receive an ontology 110, which may include the private information rules described in further detail herein, but may also include other language models or interpretation techniques or tools specifically crafted or tailored to a domain of the communication data to be analyzed. The identification of private information at 108 exemplarily results in tagging of the identified pieces of private information. In an embodiment, the private information is tagged with an identification of the specific type of private information that the actual text for the transpiration represents. In non-limiting embodiments such tags may identify whether the private information is a phone number, credit card number, social security number, an account number, a birth date, or a password.

The tag transcription is then provided to a rule engine to evaluate the compliance of the transcription with internal, legal, or regulatory private and confidential information standards for these standards may each be different and the application of differing standards may depend upon the manner of use of the transpiration or the intended manner of storage. Such standards can be translated into a series of rules which are applied to the transcription by the rules engine at 112. If the transcription meets all of the private and confidential information standards, exemplarily if the transcription contained no private or confidential information, then the transcription and/or the underlying audio data is stored at 114. In examples, the transcription may either not have contained any private or confidential information or the transcription had previously been redacted exemplarily through the use of the "mute" button by the customer service agent and such redaction met the private and confidential information standards applied by the rules engine at 112.

If the rule engine determines that the transcription does not currently comply with the applicable private and confidential information standards then at 116, the identified private or confidential information may be removed from one or both of the transcription and the underlying communication data that resulted in the transcription at 116. In one embodiment, the tagged private information may be removed completely, while in an alternative embodiment, the tagged private information may be replaced with the name of the tag such that the context of the private information conveyed in the interpersonal communication is maintained while the private information is removed from the file. In such an embodiment, a credit card number would be replaced with "credit card number." Once the private or confidential information has been removed from the transcription and/or underlying communication data, this may be stored at 114.

In an alternative embodiment, if the rules engine determines that the transcription does not comply with private and confidential information standards, then the transcription is not processed to remove the private or confidential information, but rather an alert is made at 108 to notify one or more people that one or more transcriptions that are not in compliance have been identified. Such alert may be an alert directly to the customer service agent, or an alert to a customer service agent manage, or another type of compliance officer. The alert may exemplarily may take the form of a notification on graphical display or may be textual communication such a s text or other short message service (SMS) message, an email, or other form of communication.

Figure 2:
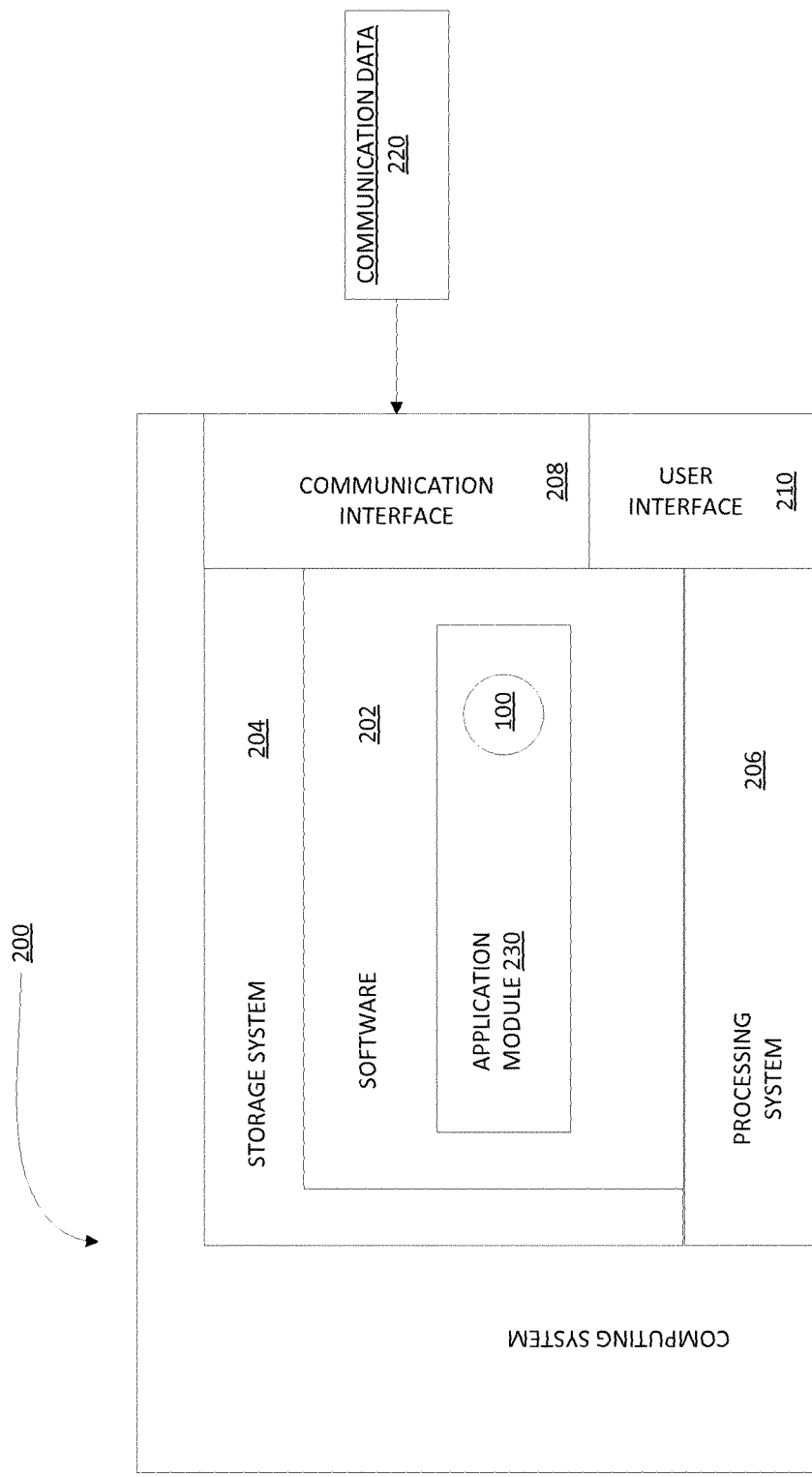
FIG. 2 depicts and exemplarily embodiment of a system 200 for the removal of private information.

FIG. 2 is a system diagram of an exemplary embodiment of a system 200 for the removal of private information. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100, and FIG. 1.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in executing program instructions. Examples of processing system 206 include general purpose central processing units, applications specific processors, and logic devices, as well as any other type of processing device, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives communication data 220 at the communication interface 208. In embodiments, the communication interface 208 operates to send and/or receive data from other devices to which the computing system 200 is communicatively connected. In an embodiment, the communication data is audio data of an interpersonal communication which may exemplarily be between two speakers. In embodiments the audio data may be any of a variety of other audio records, including recorded or streaming audio data of multiple speakers, a single speaker, or an automated or recorded auditory message. In an embodiment, the communication data is a transcription of interpersonal communication. The transcription may be generated by transcribing audio data. In an embodiment, the transcription is exemplarily achieved using a large vocabulary continuous speech recognition (LVCSR) or other transcription technique. It is understood that any audio data may also undergo various forms of pre-processing prior to LVCSR transcription. Such preprocessing may include segmentation, exemplarily with a voice activity detector (VAD) in order to segment the audio data into a series of utterances, which are segments of audio data that are likely to be speech separated by segments of audio data that are likely to be non-speech segments.

Figure 3:
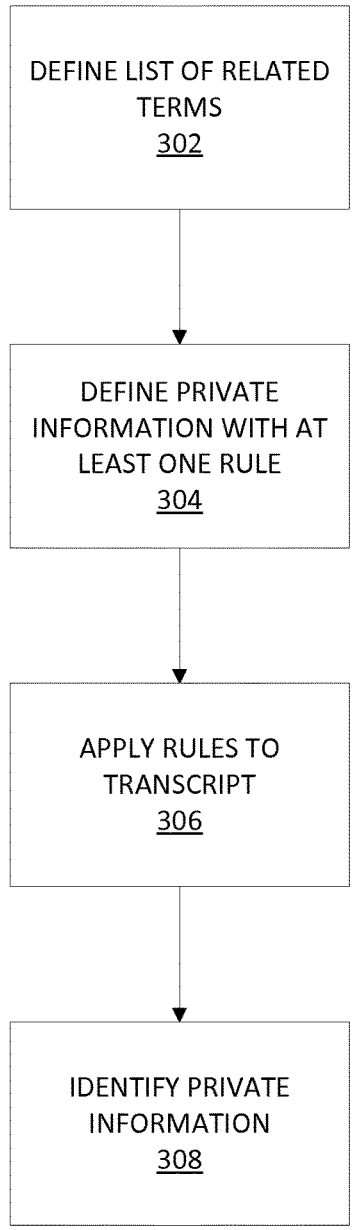
FIG. 3 is a flowchart that depicts an exemplary embodiment of a method of identifying private information.

FIG. 3 is a flow chart that depicts an exemplary embodiment of a method 300 of identifying private information in transcription data, such method may be exemplarily used to carry out the identification at 108 in FIG. 1.

A micro pattern is a flexible template that captures a relatively short concept with a relatively well-defined format. Micro patterns are similar to scripts, although typically far shorter in duration, as micro patterns are concepts that often occur in a customer service interaction such as embodied in a transcript to be analyzed. Often micro patterns include a number string or other similar strings of data that represents a concept as a whole. In non-limiting examples, micro patterns may be a pure number string, but may also represent a time period, a price, an amount of computer memory or processing speed, a percent, a daily time, a date, a year, an account balance, or an internet speed. Many forms of private information such as credit card numbers, social security numbers, account numbers, birthdays, passwords, personal identification number (PINs), email addresses, etc. take the form of a micro pattern.

The identification of private information presents further challenges as the specific speech in the customer service interaction as transcribed may be highly variable although the customer is conveying the same information. As a merely exemplary embodiment, one customer may give a birthdate as "January seventh twenty thirteen" while another customer states that the birthdate is "seventh of January," while still another customer states that the birthdate is "zero one slash zero seven slash one three". While all three of these examples appear differently in a transcript, each of these examples convey the same concept of a date. In a further non-limiting example related to a phone number, a phone number may be stated as "five five five five five five one two three four" or "five five five dash five five five dash one two three four." Still further challenges to the identification of private information in a transcription include the inclusion of extra words either through speaker style or due to speaker uncertainty. Words such as "like", "about", or "maybe" within a number string can unintentionally divide the number string in a resulting transcript while reference to "dashes" or "slashes" or "point" may further confuse and convolute the identification of an exemplary date, telephone number, social security number, account number, or PIN. In still further embodiments, regionalized differences, exemplarily in the order in which a date, month, and year are given may also create confusion.

Further aspects and details of embodiments of private information identification will be described in further detail herein.

In the method 300, the identification of private information begins at 302 by defining lists of related terms. The related terms in the lists may be single words or short sequences of words. Table 1 represents a non-limiting example of some embodiments of lists of related terms. The lists of related terms each include an identifier or name, e.g. number, ordinals, conjunctive words, months, or stop words in the example given herein.

TABLE 1

| numbers | ordinal | conjunctive words | Months | stop words |
|---------|---------|-------------------|--------|------------|
| 0 | first | and | January | the |
| zero | second | but | February | to |
| one | third | or | March | a |
| two | fourth | be | April | |
| three | fifth | for | May | |
| four | sixth | dash | . | |
| five | . | slash | . | |
| . | . | space | . | |
| . | . | point | | |
| . | | | | |
| thousand | | | | |
| million | | | | |
| billion | | | | |

At 304 at least one type of private information is defined with respect to one or more of the lists of phrases. In an embodiment, a rule that defines private information may exemplarily define four categories for the word lists, namely, affiliated words, indifferent words, inhibited words, and marker words. Affiliated words identify one or more word lists that contain words that define the start and the end of potential private information. Indifferent words identify word lists that include terms which are permissible to appear in the private information. Inhibited words contain lists for specific phrases that must not appear in private information or disqualify a word string from being identified as that private information. Marker words, which may further be divided down to left markers, internal markers, and right markers, identify words that must appear in the transcript at a position relative to the identified potential private information. Exemplarily, left markers must appear within three words before the private information, right markers identify words that must appear within three words after the private information, and internal markers identify words that must appear within the private information. It will be understood that in embodiments, private information that include left and/or right markers are expanded to include these identified marker words when identifying the private information in the transcription data. Table 2 below presents non-limiting exemplary embodiments of rules that define private information.

Example 1 for the Date Private Information

"You see that on the seventh of June but it's not also . . . "
Affiliated phrases are "seventh" and "June" (Months and Numbers)
Left Marker is "on"
Indifferent word is "of" (Conjunction)
Internal Marker is "June" (Months)

Example 2 for the Date Private Information

"Service began on Monday September nineteenth two thousand eleven . . . "

TABLE 2

| Private Information | affiliated | indifferent | length | tolerance | left markers | internal markers | right markers | inhibit |
|---|---|---|---|---|---|---|---|---|
| date | months, ordinal, numbers | conj. words, stop words, day | 2-8 | 1 | on | months | (nr) | hundred (nr) |
| date | day ordinal numbers | conj. words, stop words | 2-6 | 1 | (nr) | day | (nr) | hundred (nr) |
| social security number | number | (conj.) | 10-15 | 1 | (nr) | (nr) | (nr) | million |

It is to be understood that in embodiments, multiple definitions may exist for the same private information such as to capture varying ways in which a speaker may present private information. Thus, in the table above it will be noted that two definitions for the date private information type are included such that for example the first private information rule will identify dates given that include a month while the second micro pattern rule will identify a date given on a more relative basis given by a day of the week. Exemplarily "last Thursday" or "Tuesday the ninth."

It will be further noted that the defined private information rules may further include a length and a tolerance. In an embodiment, the length is a number of words included in the private information while the tolerance identifies a number of words that can be included in the private information that do not match one of the defined rules, namely additional words in the private information that are not found in any of the affiliated or indifferent lists. It is to be noted that words that appear on an inhibited list, would not be considered to be within a tolerance and would not fall within the private information definition. Thus, the tolerances can provide additional robustness to the private information identification in order to compensate for transcription error or additional words added into the private information in the speech of the speaker.

Referring back to FIG. 3, after the private information rules are defined at 304, these rules are applied to the transcript at 306. In an exemplary embodiment of the application of the private information rules, a computer system identifies the affiliated words in the transcript and then seeks to string the affiliated words into word strings that may include any indifferent words and any additional words within the word tolerance into string of the defined lengths. These identified strings may then be analyzed such that any left, internal, or right markers are identified and that no inhibited words exist in the possible private information. Some non-limiting examples are presented herein.

Affiliated phrases are "nineteenth", "September", and "two thousand eleven"
Left Marker is "on"
Indifferent word is "Monday"
"September nineteenth" is a date micro pattern and "two thousand eleven" is a number string micro pattern
However, the longest identified micro pattern is selected
The examples above depict the manner in which private information is identified at 308 in the transcription. Example 2 particularly highlights that in embodiments, when the same string of words in the transcript meet the definition for multiple definitions of private information, the longest identified private information is used, such that more of the text of the transcript is encompassed in the identified private information.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for automatic removal of private information, comprising:
   receiving a transcript of communication data;
   applying at least one private information rule to the transcript to identify private information in the transcript;
   tagging the identified private information with a tag comprising an identification of the private information;
   applying at least one compliance rule to the tagged transcript to evaluate a compliance of the transcript with privacy standards;
   removing the identified private information from the transcript to produce a redacted transcript; and
   storing the redacted transcript,
   wherein prior to applying the at least one private information rule, defining the at least one private information rule by:
   defining lists of related terms, wherein each of the lists of related terms include an identifier or name, and
   defining at least one category of private information with respect to one or more of the lists of related terms, wherein the at least one category is selected from the group consisting of affiliated words, indifferent words, inhibited words, and marker words,
   wherein the at least one private information rule includes a length and a tolerance, wherein the length is a number of words included in the private information and the tolerance identifies a number of words that can be included in the private information that do not match the at least one private information rule.

2. The method of claim 1, wherein affiliated words identify word lists that contain words that define the start and the end of potential private information, wherein indifferent words identify word lists that include terms which are permissible to appear in the private information, wherein inhibited words contain lists for specific phrases that must not appear in private information or disqualify a word string from being identified as that private information, wherein marker words identify words that must appear in the transcript at a position relative to the identified potential private information.

3. The method of claim 1, wherein applying the at least one private information rule to the transcript comprises identifying the affiliated words found in the transcript and stringing the affiliated words into word strings that include indifferent words and additional words that are within the word tolerance.

4. The method of claim 3 further comprising analyzing the identified stings such that any left, internal, or right markers are identified and such that no inhibited words exist in possible private information.

5. The method of claim 1, wherein removing the identified private information from the transcript to produce a redacted transcript comprises replacing the private information with a name of the tag itself.

6. A non-transitory computer-readable storage medium in which computer program instructions are stored, which instructions, when executed by a computer, cause the computer to perform the steps comprising:
   receiving a transcript of communication data;
   applying at least one private information rule to the transcript to identify private information in the transcript;
   tagging the identified private information with a tag comprising an identification of the private information;
   applying at least one compliance rule to the tagged transcript to evaluate a compliance of the transcript with privacy standards;
   removing the identified private information from the transcript to produce a redacted transcript; and
   storing the redacted transcript,
   wherein prior to applying the at least one private information rule, the instructions cause the computer to define the at least one private information rule by performing the steps comprising:
   defining lists of related terms, wherein each of the lists of related terms include an identifier or name, and
   defining at least one category of private information with respect to one or more of the lists of related terms, wherein the at least one category is selected from the group consisting of affiliated words, indifferent words, inhibited words, and marker words,
   wherein the at least one private information rule includes a length and a tolerance, wherein the length is a number of words included in the private information and the tolerance identifies a number of words that can be included in the private information that do not match the at least one private information rule.

7. The non-transitory computer-readable storage medium of claim 6, wherein affiliated words identify word lists that contain words that define the start and the end of potential private information, wherein indifferent words identify word lists that include terms which are permissible to appear in the private information, wherein inhibited words contain lists for specific phrases that must not appear in private information or disqualify a word string from being identified as that private information, wherein marker words identify words that must appear in the transcript at a position relative to the identified potential private information.

8. The non-transitory computer-readable storage medium of claim 6, wherein applying the at least one private information rule to the transcript comprises identifying the affiliated words found in the transcript and stringing the affiliated words into word strings that include indifferent words and additional words that are within the word tolerance.

9. The non-transitory computer-readable storage medium of claim 8, wherein the instructions cause the computer to perform the additional step of analyzing the identified stings such that any left, internal, or right markers are identified and such that no inhibited words exist in possible private information.

10. The non-transitory computer-readable storage medium of claim 6, wherein removing the identified private information from the transcript to produce a redacted transcript comprises replacing the private information with a name of the tag itself.

11. An apparatus comprising:
    a communication interface, which is configured to receive a transcript of communication data; and
    a hardware processor, which is configured to:
    apply at least one private information rule to the transcript to identify private information in the transcript;
    tag the identified private information with a tag comprising an identification of the private information;
    apply at least one compliance rule to the tagged transcript to evaluate a compliance of the transcript with privacy standards;

remove the identified private information from the transcript to produce a redacted transcript;
store the redacted transcript,
wherein prior to applying the at least one private information rule, define the at least one private information rule by performing the steps comprising:
defining lists of related terms, wherein each of the lists of related terms include an identifier or name, and
defining at least one category of private information with respect to one or more of the lists of related terms, wherein the at least one category is selected from the group consisting of affiliated words, indifferent words, inhibited words, and marker words,
wherein the at least one private information rule includes a length and a tolerance, wherein the length is a number of words included in the private information and the tolerance identifies a number of words that can be included in the private information that do not match the at least one private information rule.

12. The apparatus of claim 11, wherein affiliated words identify word lists that contain words that define the start and the end of potential private information, wherein indifferent words identify word lists that include terms which are permissible to appear in the private information, wherein inhibited words contain lists for specific phrases that must not appear in private information or disqualify a word string from being identified as that private information, wherein marker words identify words that must appear in the transcript at a position relative to the identified potential private information.

13. The apparatus of claim 11, wherein applying the at least one private information rule to the transcript comprises identifying by the processor the affiliated words found in the transcript and stringing the affiliated words into word strings that include indifferent words and additional words that are within the word tolerance.

14. The apparatus of claim 13, wherein the processor is further configured to analyze the identified stings such that any left, internal, or right markers are identified and such that no inhibited words exist in possible private information.

* * * * *